United States Patent
Shimbaru

(10) Patent No.: US 9,854,134 B2
(45) Date of Patent: Dec. 26, 2017

(54) COLOR PROCESSING APPARATUS AND COLOR PROCESSING METHOD

(71) Applicant: CANON KABUSHIKI KAISHA, Tokyo (JP)

(72) Inventor: Susumu Shimbaru, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 14/681,164

(22) Filed: Apr. 8, 2015

(65) Prior Publication Data
US 2015/0294486 A1    Oct. 15, 2015

(30) Foreign Application Priority Data
Apr. 15, 2014    (JP) .................................. 2014-083991

(51) Int. Cl.
G06T 11/00    (2006.01)
G06T 7/00    (2006.01)
H04N 1/60    (2006.01)

(52) U.S. Cl.
CPC ................................ H04N 1/6019 (2013.01)

(58) Field of Classification Search
None
See application file for complete search history.

(56) References Cited

U.S. PATENT DOCUMENTS

| 4,275,413 A | 6/1981 | Sakamoto et al. |
| 5,428,465 A | 6/1995 | Kanamori et al. |
| 5,724,442 A * | 3/1998 | Ogatsu ................ H04N 1/6058 358/518 |

(Continued)

FOREIGN PATENT DOCUMENTS

| CN | 1199301 A | 11/1998 |
| CN | 101123080 A | 2/2008 |

(Continued)

OTHER PUBLICATIONS

Kanamori et al., "Fast color processor with programmable interpolation by small memory (PRISM)", Journal of Electronic Imaging, vol. 2, No. 3, Bellingham, WA, Jul. 1, 1993.

(Continued)

Primary Examiner — Barry Drennan
Assistant Examiner — Jason Pringle-Parker
(74) Attorney, Agent, or Firm — Carter, DeLuca, Farrell & Schmidt, LLP

(57) ABSTRACT

When performing color conversion using a color conversion table which has signal values of an output color space corresponding to grid points dividing an input color space into a plurality of unit cubes, a quadrant to which an input signal belongs is determined, in a chromaticity plane perpendicular to a lightness axis of the input color space. A unit cube to which the input signal belongs is detected in the plurality of unit cubes. The detected unit cube is divided into a plurality of polyhedrons for interpolation operation by a segmentation method corresponding to the determined quadrant. The divide of the detected unit cube is performed along a direction of a diagonal line, which passes through an origin of the chromaticity plane, in a part of the plurality of unit cubes in accordance with the segmentation method.

16 Claims, 11 Drawing Sheets

(56) References Cited

U.S. PATENT DOCUMENTS

| | | | |
|---|---|---|---|
| 6,292,195 B1* | 9/2001 | Shimizu | H04N 1/6058 345/427 |
| 6,323,969 B1* | 11/2001 | Shimizu | H04N 1/6058 358/518 |
| 6,611,356 B1* | 8/2003 | Shimizu | H04N 1/6058 358/1.9 |
| 7,423,791 B2* | 9/2008 | Tin | H04N 1/6022 345/600 |
| 2005/0190390 A1* | 9/2005 | Yamada | H04N 1/6058 358/1.9 |
| 2008/0170269 A1* | 7/2008 | Kaneko | H04N 1/32144 358/3.28 |
| 2008/0291478 A1* | 11/2008 | Shibuya | H04N 1/6019 358/1.9 |
| 2010/0046972 A1 | 2/2010 | Jugle et al. | |
| 2010/0310160 A1* | 12/2010 | Nakajima | H04N 1/6019 382/162 |

FOREIGN PATENT DOCUMENTS

| | | |
|---|---|---|
| EP | 0602704 A2 | 6/1994 |
| JP | S58-185183 A | 10/1983 |
| JP | 2007-158948 A | 6/2007 |

OTHER PUBLICATIONS

Kanamori et al., "Fast color processor with programmable interpolation by small memory (PRISM)", Journal of Electronic Imaging, No. 3, Bellingham, WA, Jul. 2, 1993.

European Search Report issued in corresponding application No. EP 15000641.9 on Oct. 23, 2015.

Office Action for corresponding Chinese Application No. 201510178290.3 dated Jul. 17, 2017.

* cited by examiner

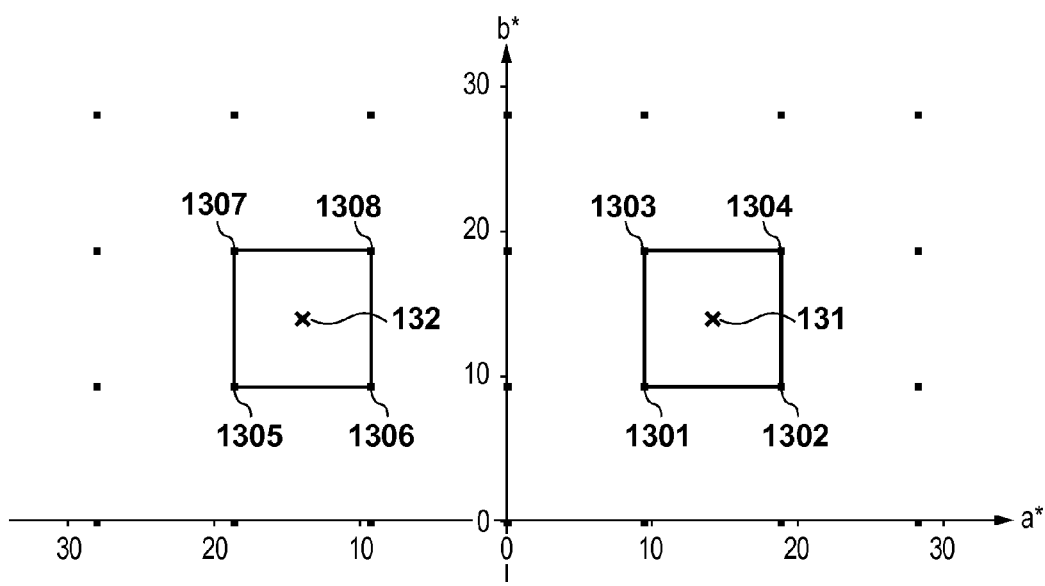
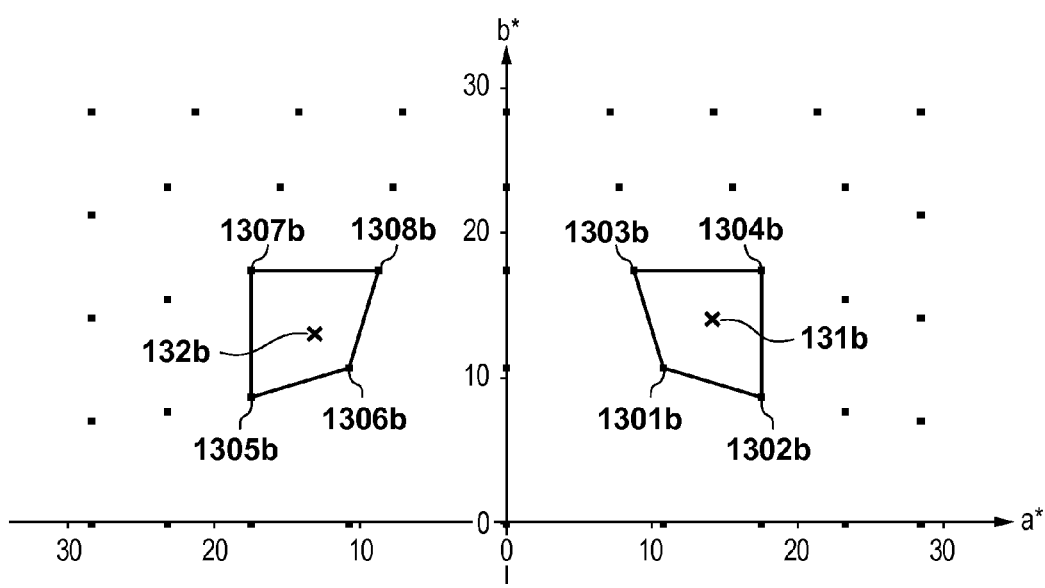

| 16.4 | 1.78 | -5.65 |
| 9.11 | 13.76 | 5.88 |
| 50.72 | 17.25 | -11.4 |
| 21.37 | -0.48 | 11.1 |
| 77.55 | -14.94 | 12.39 |
| 19.61 | -13.9 | -0.28 |
| ... | ... | ... |

| 0.00 | -128.00 | -128.00 | 0.00 | -75.00 | -75.000 |
| 0.00 | -128.00 | -120.00 | 0.00 | -75.00 | -70.315 |
| 0.00 | -128.00 | -112.00 | 0.00 | -75.00 | -65.625 |
| 0.00 | -128.00 | -114.00 | 0.00 | -75.00 | -60.940 |
| 0.00 | -128.00 | -96.00 | 0.00 | -75.00 | -56.250 |
| 0.00 | -128.00 | -88.00 | 0.00 | -75.00 | -51.565 |
| 0.00 | -128.00 | -80.00 | 0.00 | -75.00 | -46.875 |
| 0.00 | -128.00 | -72.00 | 0.00 | -75.00 | -42.190 |
| 0.00 | -128.00 | -64.00 | 0.00 | -75.00 | -37.500 |
| 0.00 | -128.00 | -56.00 | 0.00 | -75.00 | -32.815 |
| ... | ... | ... | ... | ... | ... |

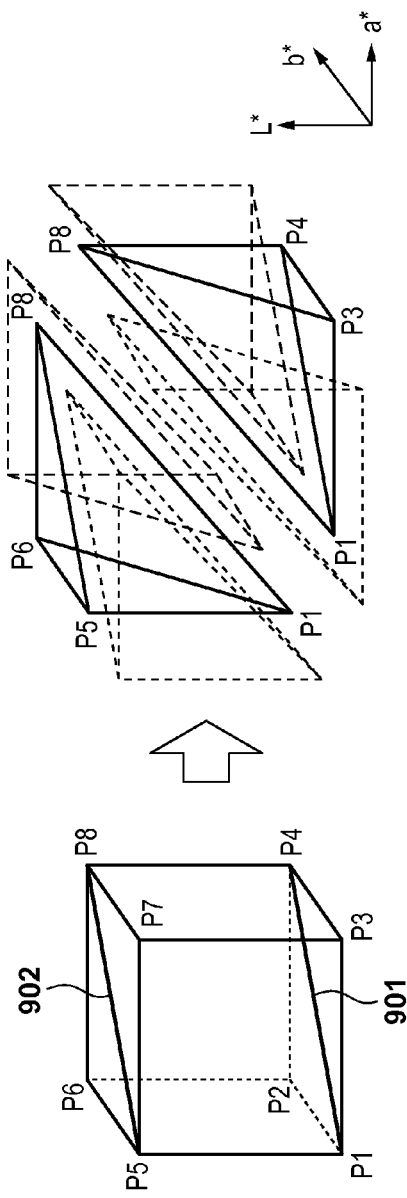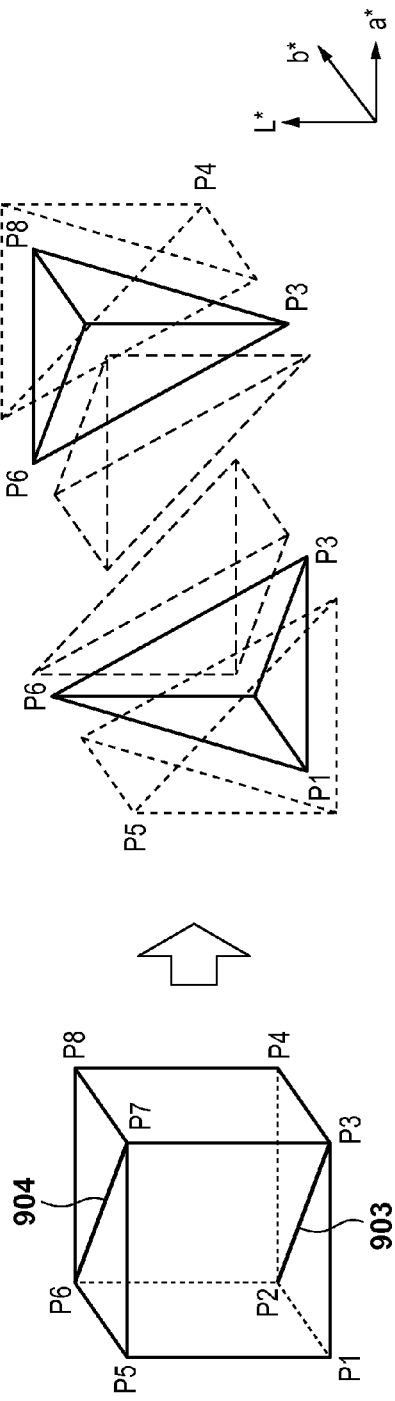

F I G. 10
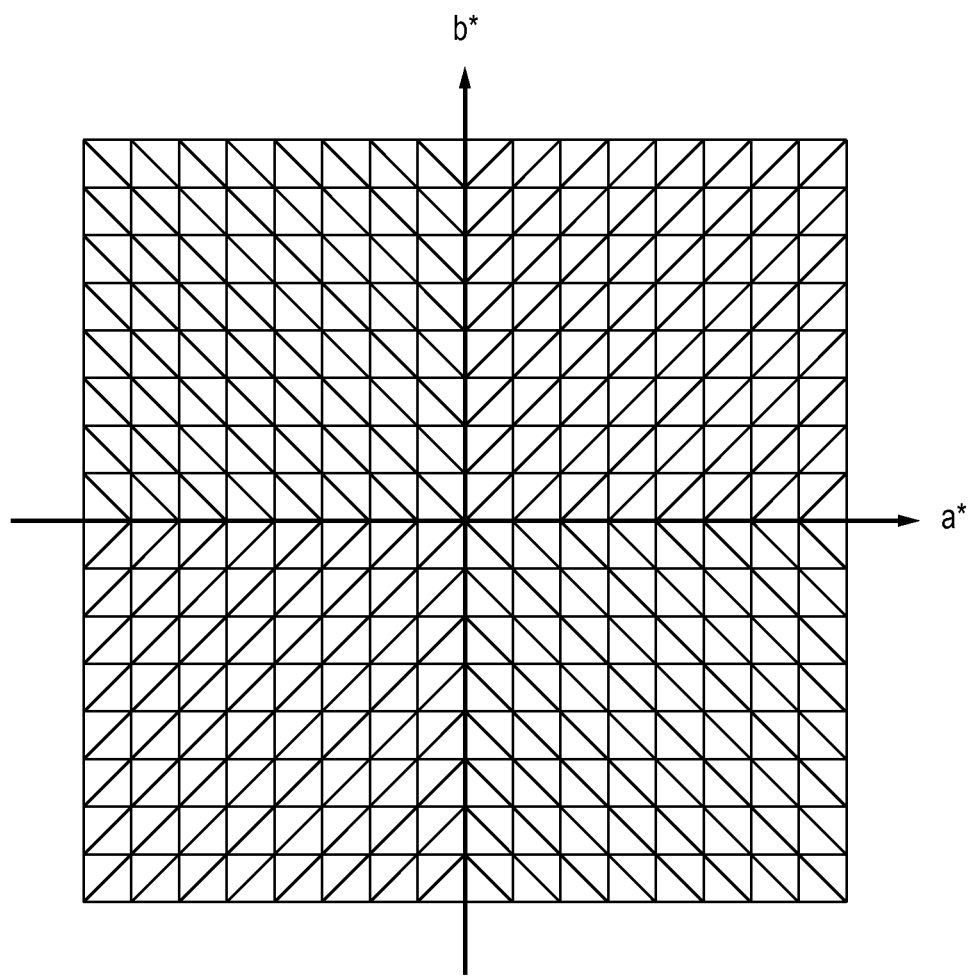

COLOR PROCESSING APPARATUS AND COLOR PROCESSING METHOD

BACKGROUND OF THE INVENTION

Field of the Invention

The present invention relates to a color processing apparatus and a color processing method, each of which converts an input signal value expressed in the first color system into an output signal value expressed in the second color system.

Description of the Related Art

A color management system (CMS) is used for color matching between a color image shooting device, color image display device, and color image printing device. A general CMS is implemented using device profiles in which the characteristics of devices for inputting/outputting color images are described.

In the device profile, a conversion formula, a conversion table, or the like for conversion between a device-dependent color space (for example, RGB or CMYK) and a device-independent color space (for example, CIELAB or CIE-LUV) is described. The device-independent space is called a PCS (Profile Connection Space), and uniquely defined under a given light source. Therefore, performing color adjustment on the PCS makes it possible to absorb the difference between the reproducible color gamuts of devices.

More specifically, a device RGB value depending on a color monitor is converted into an L*a*b* value in a device-independent color space using the device profile of the color monitor. The L*a*b* value after color adjustment is then converted into a CMYK value depending on a printer using the device profile of the printer. This processing implements color adjustment.

The mutual relationship between an RGB device such as a digital camera, scanner, or monitor corresponding to a device color space defined using RGB values and a CMYK device such as a printer corresponding to a device color space defined using CMYK values is strongly nonlinear. Consequently, a conversion table is often used as a device profile for color adjustment between an RGB device and a CMYK device.

Since a general color monitor can express 256 tones for each of the colors R, G, and B, that is, 16.7 million colors or more, it is impractical to describe L*a*b* values corresponding to the RGB values of all the expressible colors in a conversion table. To cope with this, some correspondences between representative values are described in a conversion table, and the correspondence between values other than the representative values is obtained by an interpolation operation from the correspondences between the representative values.

As an interpolation operation, linear interpolation such as cubic interpolation, triangular prism interpolation, or tetrahedron interpolation is used. In cubic interpolation, an interpolation operation is performed using the correspondences (grid point data) among the eight grid points (eight representative values) of a cubic grid surrounding a value to be interpolated. Triangular prism interpolation is a method of performing an interpolation operation using the grid point data of the six vertices (six representative values) of a triangular prism obtained by dividing the above cube into two parts. Tetrahedron interpolation is a method of performing an interpolation operation using the grid point data of the four vertices (four representative values) of a tetrahedron obtained by dividing the above cube into six parts.

Tetrahedron interpolation is widely used since the number of vertices (the number of grid point data) used for an interpolation operation is small, and the operation is easy. Tetrahedron interpolation of a point P is given by:

$$P=P1+DL(P8-P1)+Da(P3-P1)+Db(P4-P1) \qquad (1)$$

where P1, P3, P4, and P8 represent the vertices of a tetrahedron, and

DL, Da, and Db represent normalized distances in respective axis directions which indicate the position of the point P with reference to the vertex P1.

For example, an input value is an L*a*b* value of 8 bits per color, and a three-dimensional lookup table (3DLUT) having $17^3$ grid points of $16^3$ unit cubes obtained by dividing each axis of the L*a*b* space into 16 parts is used.

In triangular prism interpolation or tetrahedron interpolation, the same segmentation method (division direction) is used across the entire region of the L*a*b* space to divide each unit cube into two triangular prisms or six tetrahedrons. Then, a unit cube to which an input value belongs is determined, and a triangular prism or tetrahedron to which the input value belongs is also determined. The grid point data of the triangular prism or tetrahedron determined as that to which the input value belongs are used to calculate an output value corresponding to the input value by an interpolation operation.

As described above, in triangular prism interpolation or tetrahedron interpolation, the same method is used to divide each unit cube across the entire region of the color space of an input image. Japanese Patent Laid-Open No. 2007-158948 (literature 1) proposes an interpolation method of defining polyhedrons so that a polyhedron, which divides a unit cube having a gray axis as an edge, has no surface which has the gray axis as an edge and cuts the unit cube, in order to improve color continuity near the gray axis.

If, however, the same segmentation method (division direction) is used to divide each unit cube into triangular prisms or tetrahedrons across the entire region, and a 3DLUT having the L*a*b* space as an input color space is used, an unintended interpolation result is obtained depending on a quadrant, and the tone representing output values is distorted. Improvement in color continuity by the interpolation method proposed by literature 1 is effective for only a cube which is in contact with the gray axis. In the interpolation method proposed in literature 1 as well, an unintended interpolation result is obtained in a region corresponding to a cube which is not in contact with the gray axis, thereby causing tone distortion, which will be described in detail later.

SUMMARY OF THE INVENTION

In one aspect, a color processing apparatus for performing color conversion using a color conversion table which has signal values of an output color space corresponding to grid points dividing an input color space into a plurality of unit cubes, the apparatus comprising: a determination unit configured to determine a quadrant to which an input signal belongs, in a chromaticity plane perpendicular to a lightness axis of the input color space; a first detection unit configured to detect a unit cube to which the input signal belongs in the plurality of unit cubes; and a division unit configured to divide the detected unit cube into a plurality of polyhedrons for interpolation operation by a segmentation method corresponding to the determined quadrant, wherein the divide of the detected unit cube is performed along a direction of a diagonal line, which passes through an origin of the chromaticity plane, in a part of the plurality of unit cubes in accordance with the segmentation method.

In another aspect, a color processing method of performing color conversion using a color conversion table which has signal values of an output color space corresponding to grid points dividing an input color space into a plurality of unit cubes, the method comprising: determining a quadrant to which an input signal belongs, in a chromaticity plane perpendicular to a lightness axis of the input color space; detecting a unit cube to which the input signal belongs in the plurality of unit cubes; and dividing the detected unit cube into a plurality of polyhedrons for interpolation operation by a segmentation method corresponding to the determined quadrant, wherein the divide of the detected unit cube is performed along a direction of a diagonal line, which passes through an origin of the chromaticity plane, in a part of the plurality of unit cubes in accordance with the segmentation method.

According to these aspects, when performing color conversion using a color conversion table holding signal values in an output color space corresponding to grid points dividing an input color space into a plurality of unit cubes, it is possible to prevent tone distortion by changing a segmentation method for a unit cube to which an input value belongs depending on a quadrant to which the input signal value belongs, and solving a problem that an unintended interpolation result is obtained.

Further features of the present invention will become apparent from the following description of exemplary embodiments with reference to the attached drawings.

BRIEF DESCRIPTION OF THE DRAWINGS

FIGS. 1A and 1B are views for explaining an interpolation operation.

FIGS. 9A and 9B are views for example of a unit cube segmentation method.

FIG. 10 is a view showing an L*a*b* space segmentation method according to the embodiment.

DESCRIPTION OF THE EMBODIMENTS

A color processing apparatus and color processing method according to an embodiment of the present invention will be described in detail below with reference to the accompanying drawings. Note that the following embodiment does not limit the present invention according to the scope of the claims, and all of combinations of arrangements described in the embodiment are not always indispensable to solving means of the present invention.

An interpolation operation will be described with reference to FIGS. 1A and 1B. FIG. 1A shows grid points 1301 to 1308 surrounding input values 131 and 132 on an a*b* plane as a chromaticity plane. The input value 131 belongs to the first quadrant of the chromaticity plane, and is positioned at the center of the grid points 1301 to 1304. The input value 132 belongs to the second quadrant of the chromaticity plane, and is positioned at the center of the grid points 1305 to 1308. FIG. 1B shows output data 1301*b* to 1308*b* of the grid points 1301 to 1308 shown in FIG. 1A and interpolation results 131*b* and 132*b* of the input values 131 and 132 on the a*b* plane.

Since the output data of the 3DLUT are arranged in the first and second quadrants to be bilaterally symmetrical when viewed from the origin of the a*b* plane, the positions of the interpolation results 131*b* and 132*b* of the input values 131 and 132 should be bilaterally symmetrical when viewed from the origin. However, as shown in FIG. 1B, if the same segmentation method (division direction) is used to divide each unit cube into tetrahedrons across the entire region, the positions of the interpolation results 131*b* and 132*b* are not bilaterally symmetrical.

Referring to FIG. 1B, the interpolation result 131*b* is positioned near the middle between the output data 1301*b* and 1304*b* of the grid points when viewed from the origin, similarly to the input value 131. On the other hand, the interpolation result 132*b* is positioned not near the middle between the output data 1306*b* and 1307*b* of the grid points but closer to the output data 1306*b* when viewed from the origin.

Figure 2:
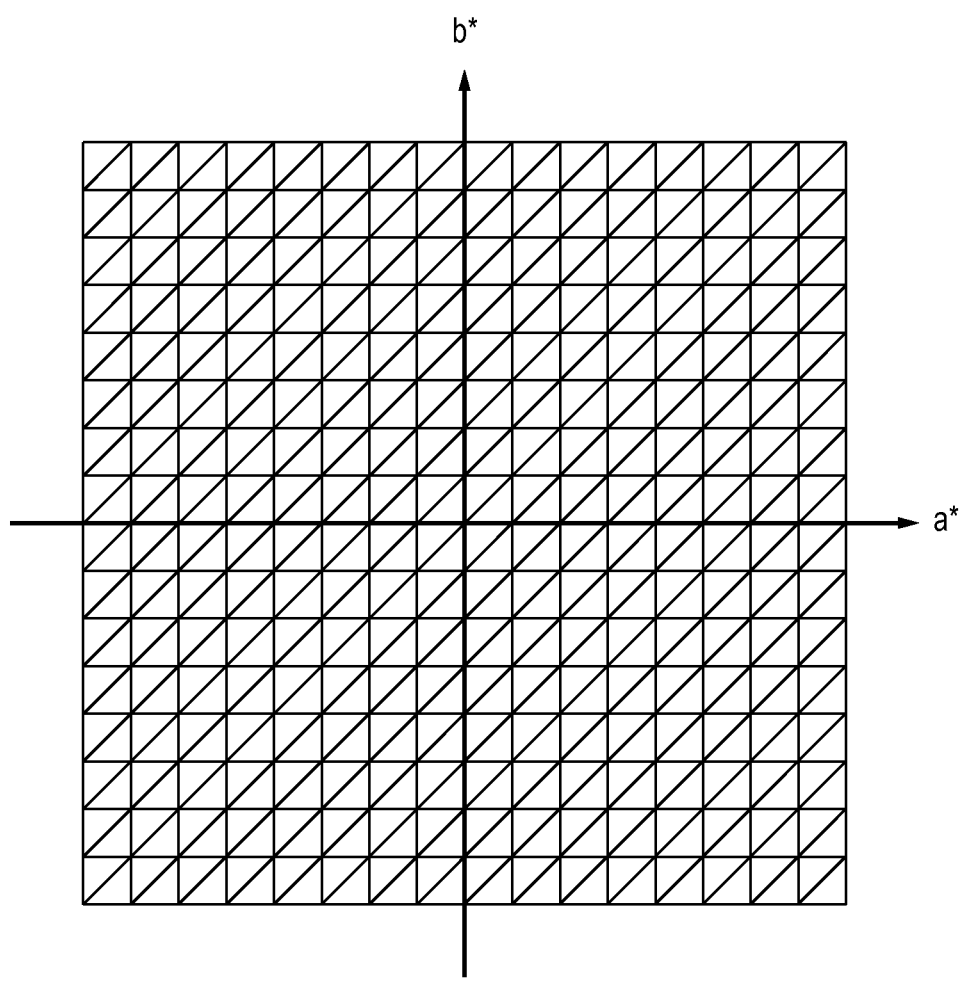
FIG. 2 is a view showing an L*a*b* space segmentation method.

FIG. 2 shows an L*a*b* space segmentation method. As shown in FIG. 2, in triangular prism interpolation or tetrahedron interpolation, the same segmentation method (division direction) is used to divide each unit cube into two triangular prisms or six tetrahedrons across the entire region of the L*a*b* space.

Unlike the RGB space or the like, the origin of the a*b* plane as a chromaticity plane is positioned on a lightness axis (gray axis) L*, that is, an axis passing through the center of the grid of the 3DLUT. If, as shown in FIG. 2, the same segmentation method (division direction) is used to divide each unit cube into two triangular prisms or six tetrahedrons, each unit cube is divided in the direction of a line extending toward the origin in the first and third quadrants of the chromaticity plane, thereby obtaining an intended interpolation result. On the other hand, in the second and fourth quadrants of the chromaticity plane, each unit cube is divided in a direction perpendicular to a line extending toward the origin, thereby obtaining an unintended interpolation result.

[Arrangement of Apparatus]

Figure 3:
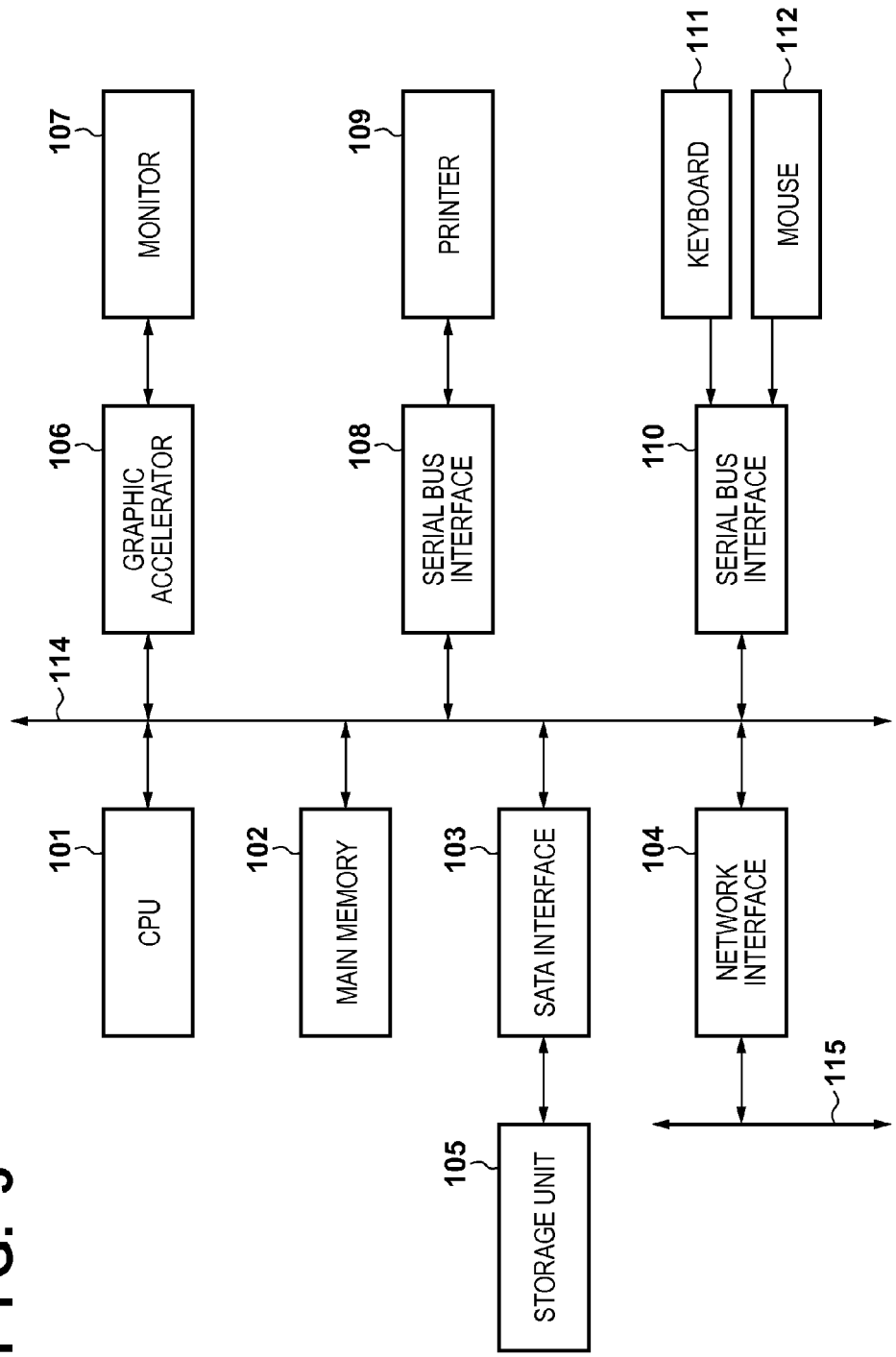
FIG. 3 is a block diagram for explaining the arrangement of an image processing apparatus according to an embodiment.

The arrangement of an information processing apparatus which executes color processing according to an embodiment will be described with reference to a block diagram shown in FIG. 3. A microprocessor (CPU) 101 executes an operating system (OS) and various programs stored in the read only memory (ROM) of a main memory 102 and a storage unit 105 using the random access memory (RAM) of the main memory 102 as a work memory. The CPU 101 controls each component through a system bus 114 such as a PCI (Peripheral Component Interconnect) bus. The CPU 101 also executes various programs including an application (to be described later), a printer driver, and a color management module (CMM).

The CPU 101 accesses the storage unit 105 such as a hard disk drive (HDD) or solid-state drive (SSD) through the system bus 114 and a serial ATA interface (SATA I/F) 103. Furthermore, the CPU 101 accesses a wired or wireless network 115 such as a local area network (LAN) through a network I/F 104.

The CPU 101 displays the user interface (UI) and processing result of processing (to be described later) on a monitor 107 through a graphic accelerator 106. The CPU 101 inputs a user instruction through a keyboard 111 and mouse 112 which are connected to a serial bus I/F 110 such as USB (Universal Serial Bus). Furthermore, the CPU 101 outputs image data to a printer 109 through a serial bus I/F 108, and prints, for example, an image instructed by the user.

A case in which a color conversion application (to be referred to as a "color conversion AP" hereinafter), image data, the device profiles of various devices, and the like are read out from the storage unit 105 will be explained below. However, these data can be read out from a server apparatus (not shown) on the network 115. Alternatively, the color conversion AP, image data, device profiles, and the like can be read out from a recording medium such as a USB memory connected to the serial bus I/F 110 or the like.

The information processing apparatus may be a computer device such as a tablet computer including, as a display unit and user instruction input unit such as a UI, the monitor 107 such as a liquid crystal display (LCD) and a touch panel overlaid on the monitor 107.

[Color Conversion Processing]

Color Conversion AP

A case in which a 3DLUT describing the correspondence between an input signal value L1*a1*b1* of each of grid points at which each axis of the CIELAB space is equally divided and an output signal value L2*a2*b2* obtained by performing correction such as color gamut mapping for the output data of the grid point is used will be described below.

Figure 4:
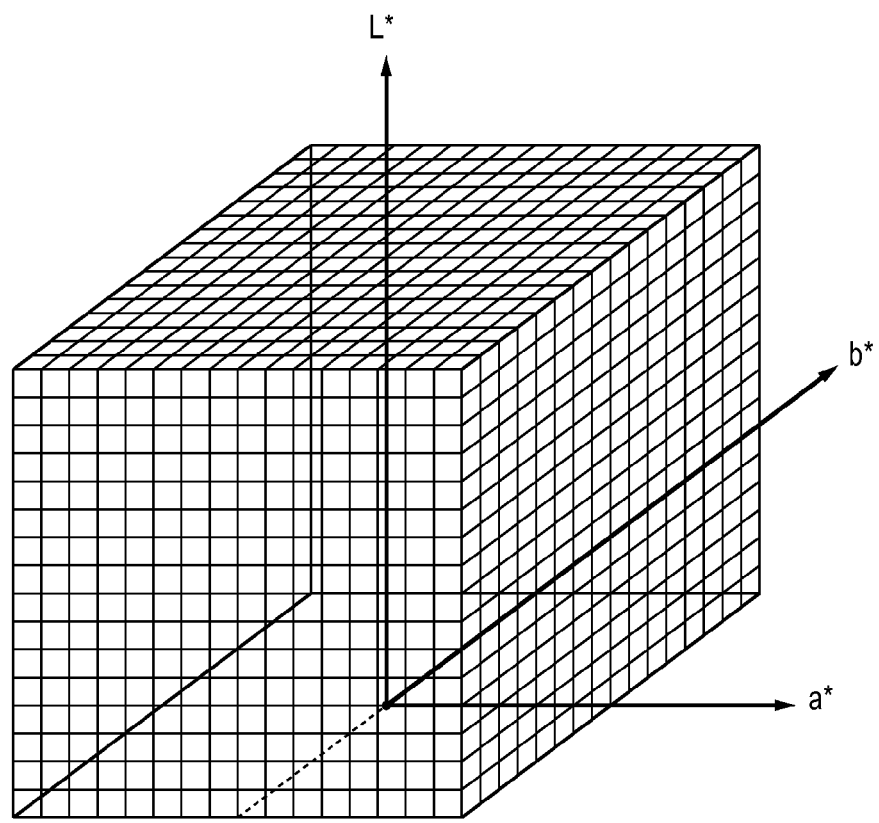
FIG. 4 is a view showing an example of a grid in the L*a*b* space.

FIG. 4 shows an example of a grid in the L*a*b* space. The grid shown in FIG. 4 has $17^3$ grid points obtained by dividing each axis of the L*a*b* space into 16 parts. The 3DLUT holds the output signal value L2*a2*b2* corresponding to the input signal value L1*a1*b1* of each grid point.

Upon receiving a user instruction to activate the color conversion AP, the CPU 101 of the information processing apparatus loads the color conversion AP stored in the storage unit 105 into the work memory, starts color conversion processing of converting an input signal value into an output signal value according to the color conversion AP, and displays a UI on the monitor 107.

Figure 5:
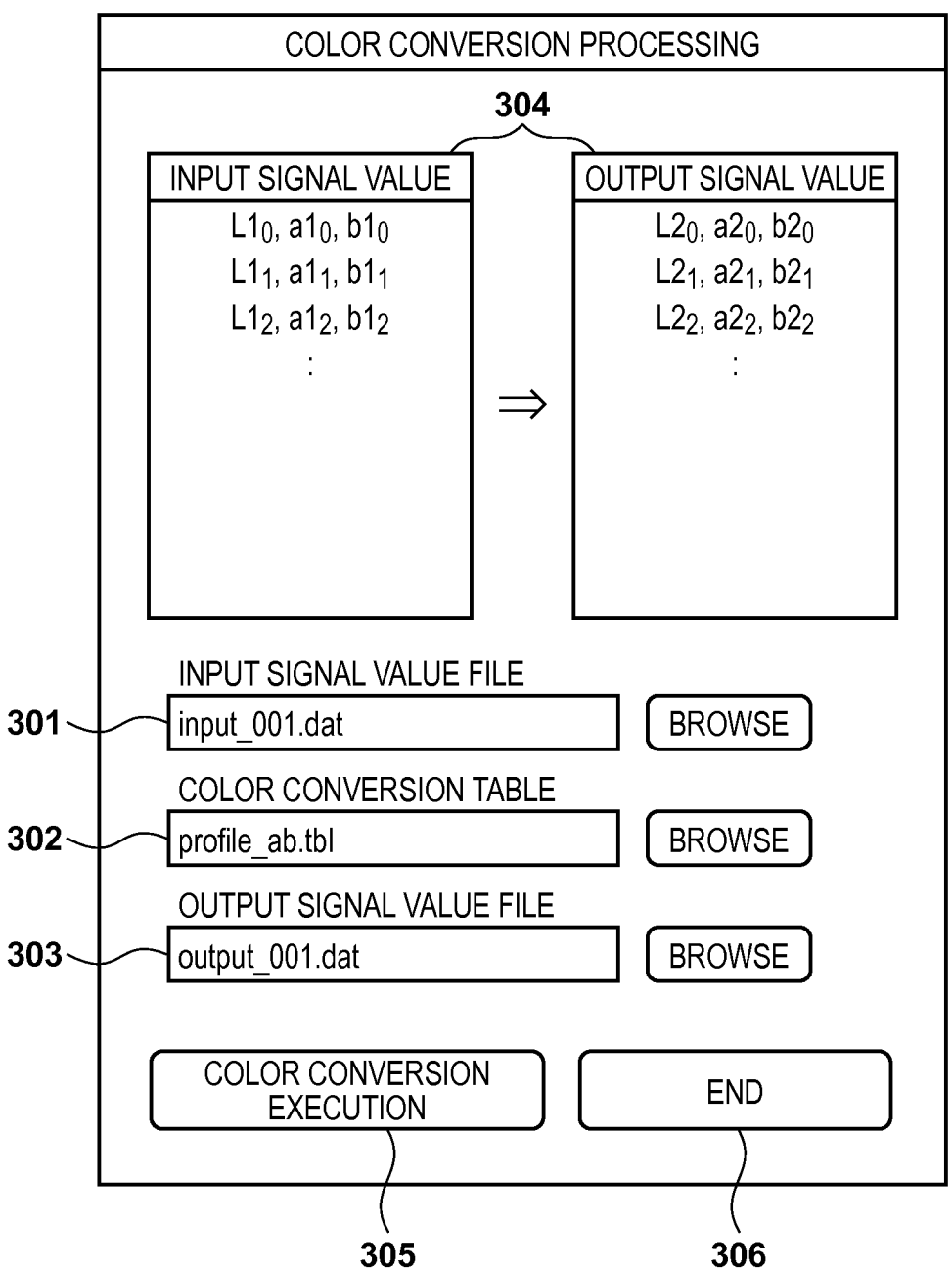
FIG. 5 is a view showing an example of the UI of a color conversion AP.

FIG. 5 shows an example of the UI of the color conversion AP. The user designates, in an input portion 301, as the source of input signals, the path name of an input signal value file in which a plurality of input signal values are described. Similarly, the user designates, in an input portion 302, the path name of the color conversion table (3DLUT) for converting an input signal value into an output signal value, and designates, in an input portion 303, the path name of an output signal value file (destination) in which an output signal value is to be described.

When a color conversion execution button 305 is pressed after the input signal value file, color conversion table, and output signal value file are designated, the CPU 101 loads the input signal value file and color conversion table, and opens the output signal value file. Note that these data exist in the storage unit 105 or a server apparatus through the network I/F 104. The CPU 101 then executes color conversion processing to display input signal values and converted output signal values in a display area 304 and write the output signal values of the color conversion processing in the output signal value file. When an end button 306 is pressed, the CPU 101 closes the input signal value file, color conversion table, and output signal value file, thereby ending the color conversion AP.

Figure 6A:
FIGS. 6A and 6B are views showing examples of the formats of an input signal value file and color conversion table, respectively.
Figure 6B:

FIGS. 6A and 6B show examples of the formats of the input signal value file and color conversion table. FIG. 6A shows an example of the format of the input signal value file when the color coordinate system of an input signal value is the CIELAB color space, in which each row represents the input color signal value of one point, the left column represents an L* value, the middle column represents an a* value, and the right column represents a b* value. Note that the format of an output signal value may be the same as that of an input signal value.

FIG. 6B shows an example of the format of the color conversion table when an input signal has an L*a*b* value and an output signal has an L*a*b* value, in which each row represents a set of the input signal value and output signal value of one point. The three left columns represent the input signal value (grid point), and the three right columns represent the output signal value. The left, middle, and right columns of the input signal value represent an L* value, a* value, and b* value, respectively. Similarly, the left, middle, and right columns of the output signal value represent an L* value, a* value, and b* value, respectively.

Processing Arrangement

Figure 11:
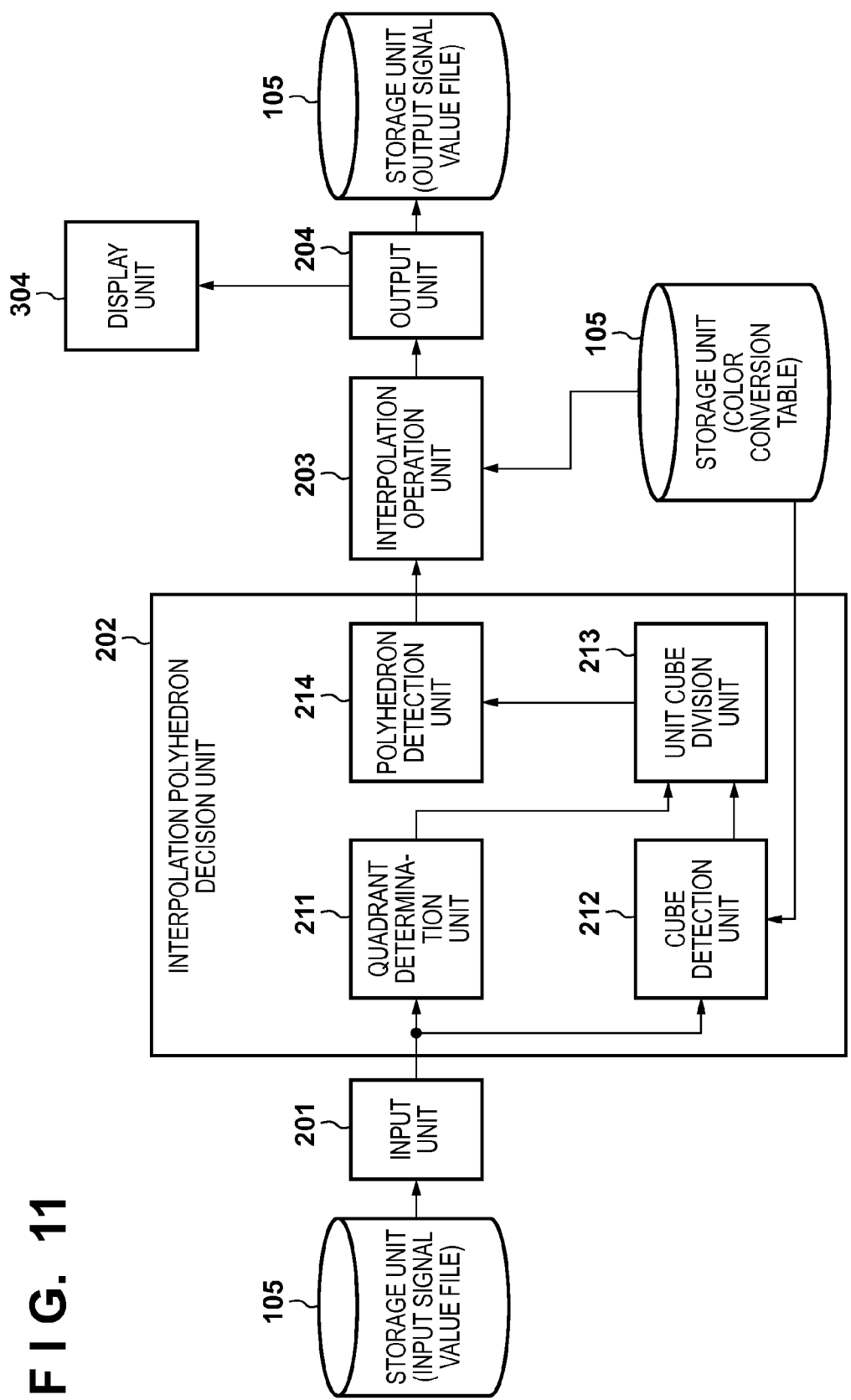
FIG. 11 is a block diagram showing the arrangement of a color processing apparatus according to the embodiment.

FIG. 11 is a block diagram showing the processing arrangement of the color processing apparatus according to the embodiment. The processing arrangement and functions shown in FIG. 11 are implemented when the CPU 101 executes the program of the color conversion AP.

An input unit 201 loads the input signal value file designated in the UI from the storage unit 105 or the like. An interpolation polyhedron decision unit 202 decides a set of grid points corresponding to a polyhedron, that is, the vertices of a polyhedron used for the interpolation operation of an input signal value with reference to the color conversion table designated in the UI. An interpolation operation unit 203 performs an interpolation operation using the output signal values of the decided grid points corresponding to the polyhedron with reference to the color conversion table designated in the UI, thereby calculating an output signal value corresponding to the input signal value. An output unit 204 writes the output signal value in the output signal value file designated in the UI while displaying the input signal value and output signal value on the display area 304.

A quadrant determination unit 211 of the interpolation polyhedron decision unit 202 determines a quadrant (to be referred to as an "assigned quadrant" hereinafter) of the a*b* plane to which the input signal value belongs, which will be described in detail later. A cube detection unit 212 searches for a unit cube (to be referred to as an "assigned cube" hereinafter) to which the input signal value belongs. A unit cube division unit 213 divides the assigned cube detected by the cube detection unit 212 into polyhedrons for an interpolation operation by a segmentation method based on the assigned quadrant determination result. A polyhedron detection unit 214 searches for a polyhedron to which the input signal value belongs, and outputs information of the detected polyhedron (to be referred to as an "assigned polyhedron" hereinafter) (information indicating a set of grid points) to the interpolation operation unit 203.

Figure 7:
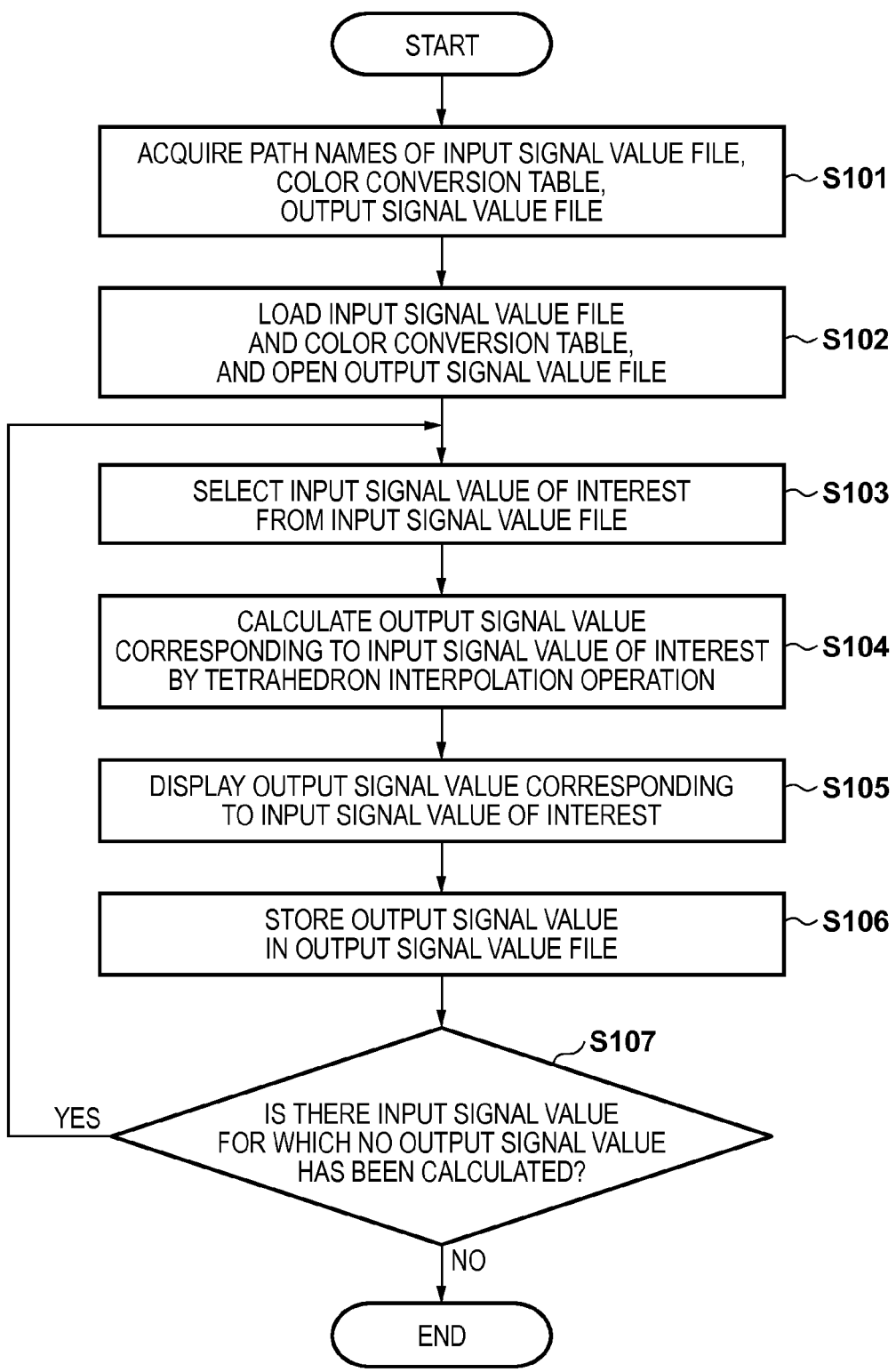
FIG. 7 is a flowchart for explaining color conversion processing.

Color conversion processing executed by a color conversion apparatus will be described with reference to a flowchart shown in FIG. 7. The color conversion processing shown in FIG. 7 is processing executed when the color conversion execution button 305 is pressed.

The CPU 101 acquires the path names of the input signal value file as the source of the input signal, the color conversion table to be referred to, and the output signal file as the destination of the output signal, which have been designated in the UI (S101). The CPU 101 loads the input signal value file and color conversion table, and opens the output signal value file (S102).

The CPU 101 selects an input signal value of interest from the input signal value file (S103). If the color space of the input signal value is different from the input color space of the color conversion table, the CPU 101 performs processing of converting the input signal value into a signal value in the input color space of the color conversion table.

The CPU 101 performs a tetrahedron interpolation operation based on the input signal value of interest and the color conversion table to calculate an output signal value corresponding to the input signal value of interest (S104), which will be described in detail later. The CPU 101 then displays the input signal value of interest and the corresponding output signal value on the display area 304 (S105), and stores the output signal value in the output signal value file (S106).

The CPU 101 determines whether output signal values corresponding to all the input signal values described in the input signal value file have been calculated (S106). If there is an input signal value for which no output signal value has been calculated, the CPU 101 returns the process to step S103 to repeat the processes in steps S103 to S105. If there is no input signal value for which no output signal value has been calculated, the CPU 101 ends the color conversion processing.

Tetrahedron Interpolation Operation

Figure 8:
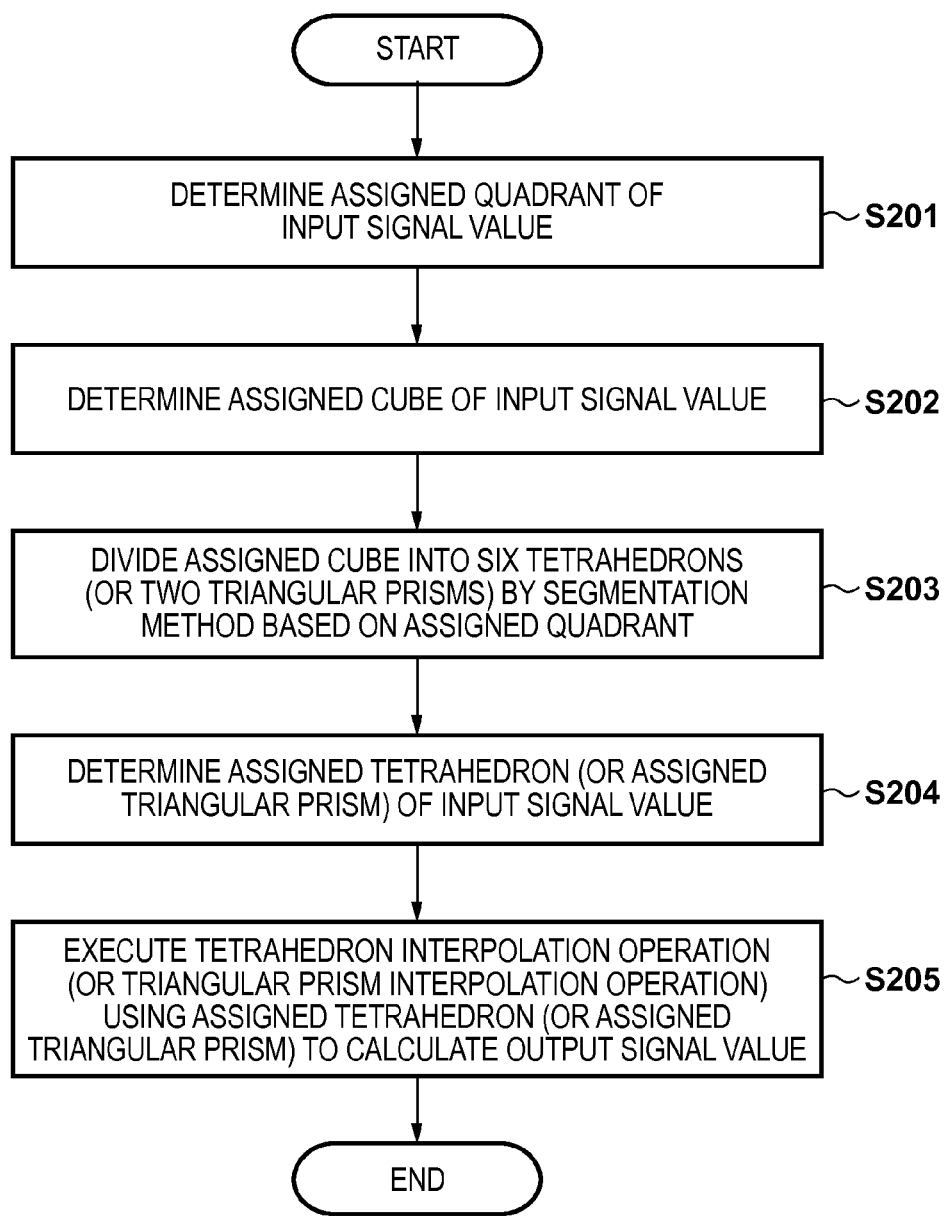
FIG. 8 is a flowchart for explaining details of a tetrahedron interpolation operation.

The tetrahedron interpolation operation (S104) will be described in detail with reference to a flowchart shown in FIG. 8.

The quadrant determination unit 211 determines a quadrant (assigned quadrant) of the a*b* plane to which the input signal value belongs (S201). The L*a*b* space is divided by two grid surfaces which include the L* axis and are perpendicular to each other. The following four quadrants are delimited around the L* axis on the a*b* plane perpendicular to the L* axis:

first quadrant Q1: a*≥0, b*≥0;
second quadrant Q2: a*<0, b*≥0;
third quadrant Q3: a*<0, b*<0; and
fourth quadrant Q4: a*≥0, b*<0.

The quadrant determination unit 211 determines an assigned quadrant based on the product obtained by multiplying the color component signal values a* and b* of the input signal value, as given by:

if $(a^* \times b^* > 0)$ first quadrant $Q1$ or third quadrant $Q3$;

else second quadrant $Q2$ or fourth quadrant $Q4$; (2)

The cube detection unit 212 searches for a unit cube (assigned cube) to which the input signal value belongs (S202). The unit cube division unit 213 divides the assigned cube detected by the cube detection unit 212 into six tetrahedrons by a segmentation method based on the assigned quadrant as a determination result (S203).

The assigned cube segmentation method will be described with reference to FIGS. 9A and 9B. If the assigned quadrant is the first quadrant Q1 or the third quadrant Q3, the CPU 101 divides the assigned cube by a segmentation method shown in FIG. 9A. Alternatively, if the assigned quadrant is the second quadrant Q2 or the fourth quadrant Q4, the CPU 101 divides the assigned cube by a segmentation method shown in FIG. 9B.

The polyhedron detection unit 214 searches for a tetrahedron (assigned tetrahedron) to which the input signal value belongs (S204). The interpolation operation unit 203 acquires the output signal values of the grid points of the assigned tetrahedron detected by the polyhedron detection unit 214 from the color conversion table, and executes a tetrahedron interpolation operation using the output signal values to calculate an output signal value (S205). That is, the interpolation operation unit 203 performs an interpolation operation to obtain an output signal value corresponding to the input signal value by setting the four grid points forming the assigned tetrahedron as reference grid points whose output signal values are to be referred to.

The interpolation operation unit 203 performs a weighted interpolation operation using weights according to the distances between the input signal value and the respective reference grid points, thereby calculating the output signal value L2*a2*b2* corresponding to the input signal value L1*a1*b1*. For example, the weight coefficient of each reference grid point is calculated based on a distance ΔD between the input signal value L1*a1*b1* and the reference grid point, output signal values corresponding to the four reference grid points are respectively multiplied by the corresponding weight coefficients, and the average value of the multiplication results is set as the output signal value L2*a2*b2*, as given by:

$\Delta D_1 = |P_1 - P_0|;$ $\Delta D_2 = |P_2 - P_0|;$ $\Delta D_3 = |P_3 - P_0|;$ $\Delta D_4 = |P_4 - P_0|;$ $\Delta D = \Sigma_{i=1}^{4} \Delta D_i;$ $Po = (1.0 - \Delta D_1/\Delta D)P_1 + (1.0 - \Delta D_2/\Delta D)P_2 + (1.0 - \Delta D_3/\Delta D)P_3 + (1.0 - \Delta D_4/\Delta D)P_4;$ (3)

where $P_0$ represents the input signal value,
$P_1$ to $P_4$ represent the output signal values corresponding to the reference grid points, and
Po represents the output signal value.

FIG. 10 shows an L*a*b* space segmentation method according the embodiment. The segmentation method in the first quadrant Q1 and the third quadrant Q3 is the same as that shown in FIG. 2 but the segmentation method in the second quadrant Q2 and the fourth quadrant Q4 is different from that shown in FIG. 2.

In the first quadrant Q1 and the third quadrant Q3, if vertices P1 and P5 of a unit cube shown in FIG. 9A correspond to the origin of the a*b* plane, lines 901 and 902 respectively passing through the vertices are defined as base division lines, and the unit cube is divided into tetrahedrons. For a unit cube without vertices corresponding to the origin, lines parallel to the lines 901 and 902 are defined as base division lines.

In the second quadrant Q2 and the fourth quadrant Q4, if vertices P3 and P7 of a unit cube shown in FIG. 9B correspond to the origin of the a*b* plane, lines 903 and 904 respectively passing through the vertices are defined as base division lines, and the unit cube is divided into tetrahedrons. For a unit cube without vertices corresponding to the origin, lines parallel to the lines 903 and 904 are defined as base division lines.

In other words, if a unit cube has an edge coinciding with the lightness axis passing through the origin, in a chromaticity plane (a*b* plane) to which one vertex on the edge belongs, a line segment connecting the one vertex with a vertex farthest from the lightness axis among the vertices of the unit cube is set as a base division line for dividing the unit cube. Furthermore, in a chromaticity plane to which the other vertex on the edge coinciding with the lightness axis, a line segment connecting the other vertex with the vertex farthest from the lightness axis among the vertices of the unit cube is set as another base division line for dividing the unit cube.

Alternatively, if a unit cube has no edge coinciding with the lightness axis, in a chromaticity plane to which one vertex on an edge parallel to the lightness axis and closest to the lightness axis belongs, a line segment connecting the one vertex with a vertex farthest from the lightness axis among the vertices of the unit cube is set as a division line for dividing the unit cube. Furthermore, in a chromaticity plane to which the other vertex on the edge parallel to the lightness axis and closest to the lightness axis, a line segment connecting the other vertex with the vertex farthest from the lightness axis among the vertices of the unit cube is set as another base division line for dividing the unit cube.

After a unit cube is divided into two triangular prisms according to the base division lines, these triangular prisms are divided into a plurality of tetrahedrons, as shown in FIGS. 9A and 9B.

A case in which a unit cube is divided into six tetrahedrons by the segmentation method based on the quadrant (assigned quadrant) to which the input signal value belongs and a tetrahedron interpolation operation is performed has been described above. However, a unit cube may be divided into two triangular prisms by the segmentation method based on the assigned quadrant (S203), a triangular prism (assigned triangular prism) to which the input signal value belongs may be determined (S204), and a triangular prism interpolation operation may be performed to calculate an output signal value (S205). In other words, it is only necessary to divide a unit cube into a plurality of polyhedrons by the segmentation method based on the assigned quadrant, and perform an interpolation operation using the polyhedron.

Each triangular prism obtained by dividing a unit cube is defined to have, as an edge, part of a line connecting the lightness axis L* and a grid point farthest from the lightness axis L* in the assigned quadrant or part of a line parallel to the line. A line connecting the lightness axis L* and a grid point farthest from the lightness axis L* in the assigned quadrant or a line parallel to the line is defined as a base division line for tetrahedrons. Note that the base division line represents the first line for starting division of the unit cube.

As described above, by the L*a*b* space segmentation method according to the embodiment, division is performed along a line passing through the origin of the a*b* plane or a line parallel to the line regardless of the quadrant, thereby obtaining an intended interpolation result. In other words, it is possible to solve the above-described problem that an unintended interpolation result is obtained in the second quadrant Q2 or the fourth quadrant Q4. Note that a line passing through the origin of the a*b* plane intersects the lightness axis (gray axis) L*, as a matter of course.

By changing the segmentation method (division direction) for a unit cube (assigned cube) to which an input signal value belongs depending on a quadrant to which the input signal value belongs, it is possible to solve the problem that an unintended interpolation result is obtained, improve an error between quadrants, and prevent tone distortion.

Modification of Embodiment

A case in which the L*a*b* space is set as an input color space has been explained above. However, the input color space is not limited to this, and the L*u*v* space, the JCh space using CIECAM02, or the like may be used. Furthermore, a case in which the L*a*b* color space that is the same as the input color space is used as an output color space has been described. However, the output color space is not limited to this, and the L*u*v* space, the JCh space using CIECAM02, the RGB space, or the CMYK space may be used.

A case in which a unit cube segmentation method is changed for only the a*b* plane has been explained above. However, for example, when color conversion using a color conversion table is color gamut mapping with reference to L*=50, L*=50 is regarded as an origin, and a segmentation method in the lightness direction can be changed between a region with L* 50 and a region with L*<50.

Expression (2) shows a case in which the first quadrant Q1 or third quadrant Q3 is determined when the product exceeds 0, and the second quadrant Q2 or fourth quadrant Q4 is determined when the product is 0 or less. However, the first quadrant Q1 or third quadrant Q3 may be determined when the product is 0 or more, and the second quadrant Q2 or fourth quadrant Q4 may be determined when the product is less than 0.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083991 filed Apr. 15, 2014 which is hereby incorporated by reference herein in its entirety.

What is claimed is:

1. A color processing apparatus for performing color conversion using a color conversion table which has signal values of an output color space corresponding to grid points dividing an input color space into a plurality of unit cubes, the apparatus comprising:
one or more processors; and
a memory coupled to the one or more processors and having stored thereon instructions, which, when executed by the one or more processors, cause the color processing apparatus to:
determine a quadrant to which an input signal belongs, in a chromaticity plane perpendicular to a lightness axis of the input color space;
detect a unit cube to which the input signal belongs in the plurality of unit cubes; and
divide the detected unit cube into a plurality of polyhedrons for an interpolation operation by a segmentation method corresponding to the determined quadrant,
wherein the dividing of the detected unit cube is performed along a direction of a diagonal line, which passes through an origin of the chromaticity plane, in a part of the plurality of unit cubes in accordance with the segmentation method.

2. The apparatus according to claim 1, wherein the instructions, when executed by the one or more processors, further cause the color processing apparatus to:
detect a polyhedron to which the input signal belongs in the plurality of polyhedrons; and
generate an output signal in the output color space corresponding to the input signal by an interpolation operation using the signal values of the grid points corresponding to the detected polyhedron.

3. The apparatus according to claim 2, wherein the quadrant to which the input signal belongs is determined based on a product of color-component signal values of the input signal.

4. The apparatus according to claim 3, wherein the input signal is determined to belong to a first or third quadrant in a case where the product is greater than zero, and the input signal is determined to belong to a second or fourth quadrant in another case where the product is equal to or less than zero.

5. The apparatus according to claim 4, wherein the segmentation method comprises a first segmentation method in the case where the input signal belongs to the first or third quadrant, and a second segmentation method in the other case where the input signal belongs to the second or fourth quadrant.

6. The apparatus according to claim 1, wherein, in a case where there is an edge of the unit cube coinciding with the lightness axis, as a first dividing line to divide the unit cube, a line segment, which connects with a vertex on the edge and a vertex farthest from the lightness axis in vertices of the unit cube, is set in the chromaticity plane to which the vertex on the edge belongs, and, as a second dividing line to divide the unit cube, a line segment, which connects with another vertex on the edge and a vertex farthest from the lightness axis in the vertices of the unit cube, is set in the chromaticity plane to which the other vertex on the edge belongs.

7. The apparatus according to claim 6, wherein, in another case where there is no edge of the unit cube coinciding with the lightness axis, as a first dividing line to divide the unit cube, a line segment, which connects with a vertex on an edge parallel to the lightness axis and closest to the lightness axis and a vertex farthest from the lightness axis in vertices of the unit cube, is set in the chromaticity plane to which the vertex on the edge belongs, and, as a second dividing line to divide the unit cube, a line segment, which connects with another vertex on the edge and a vertex farthest from the lightness axis in the vertices of the unit cube, is set in the chromaticity plane to which the other vertex on the edge belongs.

8. The apparatus according to claim 6, wherein the plurality of polyhedrons comprises a plurality of triangular prisms divided from the unit cube in accordance with the first and second dividing lines.

9. The apparatus according to claim 6, wherein the plurality of polyhedrons comprises a plurality of tetrahedrons divided from a plurality of triangular prisms which are divided from the unit cube in accordance with the first and second dividing lines.

10. The apparatus according to claim 2, wherein the instructions, when executed by the one or more processors, further cause the color processing apparatus to:
input instructions indicating a source of the input signal, the color conversion table, and a destination of the output signal;
input the input signal from the source; and
output the generated output signal to the destination,
wherein detecting the unit cube and generating the output signal include referring to the color conversion table in accordance with the instructions.

11. A color processing method of performing color conversion using a color conversion table which has signal values of an output color space corresponding to grid points dividing an input color space into a plurality of unit cubes, the method comprising:
using a processor to perform steps of:
determining a quadrant to which an input signal belongs, in a chromaticity plane perpendicular to a lightness axis of the input color space;
detecting a unit cube to which the input signal belongs in the plurality of unit cubes; and
dividing the detected unit cube into a plurality of polyhedrons for an interpolation operation by a segmentation method corresponding to the determined quadrant,
wherein the dividing of the detected unit cube is performed along a direction of a diagonal line, which passes through an origin of the chromaticity plane, in a part of the plurality of unit cubes in accordance with the segmentation method.

12. A non-transitory computer readable medium storing a computer-executable program for causing a computer to perform a color processing method of performing color conversion using a color conversion table which has signal values of an output color space corresponding to grid points dividing an input color space into a plurality of unit cubes, the method comprising:
determining a quadrant to which an input signal belongs, in a chromaticity plane perpendicular to a lightness axis of the input color space;
detecting a unit cube to which the input signal belongs in the plurality of unit cubes; and dividing the detected unit cube into a plurality of polyhedrons for an interpolation operation by a segmentation method corresponding to the determined quadrant, wherein the dividing of the detected unit cube is performed along a direction of a diagonal line, which passes through an origin of the chromaticity plane, in a part of the plurality of unit cubes in accordance with the segmentation method.

13. A color processing apparatus for performing color conversion using a color conversion table which has signal values of an output color space corresponding to grid points dividing an input color space into a plurality of unit cubes, the apparatus comprising:
one or more processors; and
a memory coupled to the one or more processors and having stored thereon instructions, which, when executed by the one or more processors, cause the color processing apparatus to:
determine a quadrant to which an input signal belongs, in a chromaticity plane perpendicular to a lightness axis of the input color space;
detect a unit cube to which the input signal belongs in the plurality of unit cubes; and
output an output signal corresponding to the input signal by an interpolation operation, which is based on the determined quadrant, using the signal values of the output color space,
wherein the signal values of the output color space for the interpolation operation are, in a case where the unit cube to which the input signal belongs is divided into a plurality of polyhedrons along a direction of a diagonal line, which passes through an origin of the chromaticity plane, in a part of the plurality of unit cubes in accordance with a segmentation method corresponding to the determined quadrant, the signal values of the output color space corresponding to vertices of a polyhedron to which the input signal belongs in the plurality of polyhedrons.

14. The apparatus according to claim 13, wherein the segmentation method comprises a first segmentation method in the case where the input signal belongs to a first or third quadrant, and a second segmentation method in the other case where the input signal belongs to a second or fourth quadrant, wherein the first segmentation method is different from the second segmentation method.

15. The apparatus according to claim 14, wherein the plurality of polyhedrons comprises a plurality of triangular prisms.

16. The apparatus according to claim 14, wherein the plurality of polyhedrons comprises a plurality of tetrahedrons.

* * * * *